United States Patent [19]

Dewitz

[11] Patent Number: 5,127,772
[45] Date of Patent: Jul. 7, 1992

[54] METHOD AND APPARATUS FOR THE CONTROL OF SUSPENSION DENSITY BY USE OF A RADIATION SOURCE

[75] Inventor: Thomas S. Dewitz, Houston, Tex.

[73] Assignee: Shell Oil Company, Houston, Tex.

[21] Appl. No.: 98,179

[22] Filed: Sep. 18, 1987

[51] Int. Cl.[5] .............................. B65G 53/04; B01J 3/00
[52] U.S. Cl. .................................. 406/93; 406/90; 48/62 R
[58] Field of Search .............. 406/10, 12, 19, 28, 406/31, 89, 90, 91, 134, 145, 147, 198, 138; 48/62 R, 77, 76, 86 R, 87

[56] References Cited

U.S. PATENT DOCUMENTS

| | | | |
|---|---|---|---|
| 2,924,489 | 2/1960 | Beckmann | 406/90 |
| 3,001,829 | 9/1961 | De Saint-Martin | 406/90 |
| 3,514,217 | 5/1970 | Reiss | 406/31 X |
| 4,049,394 | 9/1977 | Gernhardt et al. | 48/62 R |
| 4,089,563 | 5/1978 | Neu | 406/138 X |
| 4,270,558 | 6/1981 | Förster et al. | 406/31 X |
| 4,415,296 | 11/1983 | Funk | 406/19 |
| 4,490,077 | 12/1984 | Shimada et al. | 406/124 X |
| 4,498,819 | 2/1985 | El-Saie | 406/19 X |
| 4,521,139 | 6/1985 | Kretschmer et al. | 406/19 |
| 4,611,955 | 9/1986 | Doerr | 406/31 |
| 4,613,259 | 9/1986 | Packer et al. | 406/19 X |

FOREIGN PATENT DOCUMENTS 8203273 9/1982 PCT Int'l Appl. .

Primary Examiner—Joseph F. Peters, Jr.
Assistant Examiner—Anne E. Bidwell

[57] ABSTRACT

The suspension density and mass flow rate of a particular solids and gas mixture transported to a reactor is controlled by using a radiation source and detector. The suspension density is measured and compared to a preselected value. The result is converted to a control signal which may be used to control venting from the vessel, and/or the amount of aeration gas supplied to the lower portion of the vessel, in order to maintain the suspension density at the preselected value and provide a constant mass flow rate.

2 Claims, 1 Drawing Sheet

METHOD AND APPARATUS FOR THE CONTROL OF SUSPENSION DENSITY BY USE OF A RADIATION SOURCE

RELATED APPLICATIONS

This invention is related to Assignee's patent application Ser. No. 355,860, filed May 18, 1989, now U.S. Pat. No. 4,941,779, which was a continuation of Ser. No. 098,161 filed Sep. 18, 1987, now abandoned.

BACKGROUND OF THE INVENTION

Conventional coal feed systems using gravity flow of solids, such as in a coil feed to coal-fired boilers, allow major fluctuations in the coal suspension density and mass flow rate, which is a product of the density and velocity of the solids.

However, fluctuations of coal suspension density and mass flow rate to burners within a coal gasification reactor, hereinafter referred to as a gasifier, are detrimental to gasifier performance. For example, such fluctuations cause inefficient combustion of fuel within the gasifier and damaging heat fluxes to the burner face within a reaction zone near the burner which result in thermal stresses on the burner face. Since the residence time of the coal within the reaction zone of the reactor is approximately 200 milliseconds or less, preferably 80 milliseconds, the coal suspension density and mass flow rate should preferably be constant over periods of this order and preferably over shorter periods to maintain constant local conditions. The coal suspension densities used in the present invention range from 50–800 kg/m$^3$, preferably 200–500 kg/m$^3$.

U.S. Pat. No. 4,049,394 is related to maintaining a predetermined volumetric ratio between fuel and a gasification agent during feeding thereof into a gasification reactor. However, this patent is not directed to controlling the suspension density to yield a uniform, constant mass flow rate of the fuel and gasification agent to the reactor.

The present invention is directed to controlling the suspension density of the coal to provide a uniform, constant mass flow rate to the burners of a gasifier over time periods as short as 0.2 seconds or less.

Applicant is not aware of any prior art which, in his judgment as one skilled in this particular art, would anticipate or render obvious the present invention. However, for the purpose of fully developing the background of the invention, and establishing the state of requisite art, the following are is set forth: U.S. Pat. Nos. 3,339,984; 3,514,217; 4,049,394; 4,482,275; RE 31,676 and 4,490,077.

SUMMARY OF THE INVENTION

The primary purpose of the present invention relates to controlling the suspension density of a particulate solids and gas mixture conveyed from a vessel to at least one means for injecting the mixture into a reactor so as to yield a uniform, constant mass flow rate to the reactor. In particular, this invention relates to controlling the suspension density of a particulate solid coal and gas mixture having a suspension density ranging from about 50–800 kg/m$^3$, delivered to a gasifier where the residence time for the fuel within the reactor is approximately 0.2 seconds.

Preferably, such an apparatus includes means for positioning at least one radiation source to penetrate the cross-sectional area of the mixture being conveyed, means for positioning at least one radiation detector substantially diametrically opposite the radiation source to receive radiation from the source at least a portion of which is transmitted through the mixture, means for transmitting radiation from the source to the detector, means for receiving radiation by the detector, means for transmitting signals relative to the determined suspension density of the mixture to a means for comparing the determined suspension density with a preselected value, means for comparing the determined suspension density with a preselected value, and means for adjusting the suspension density of the mixture to obtain substantially the preselected value.

Preferably, a method includes positioning at least one radiation source to penetrate the cross-sectional area of the mixture being conveyed, positioning at least one radiation detector substantially diametrically opposite the radiation source to receive radiation from the source at least a portion of which is transmitted through the mixture, transmitting radiation from the source to the detector, receiving radiation by the detector, transmitting signals relative to the determined suspension density of the mixture to a means for comparing the determined suspension density with a preselected value, comparing the determined suspension density with a preselected value, and adjusting the suspension density of said mixture to obtain substantially the preselected value.

The various features of novelty which characterize the invention are pointed out with particularity in the claims forming a part of this disclosure. For a better understanding of this invention, its operating advantages and specific object obtained by its uses, reference may be made to the accompanying drawing and descriptive mater in which there are illustrated preferred embodiments of the invention.

DESCRIPTION OF A PREFERRED EMBODIMENT

Figure 1:
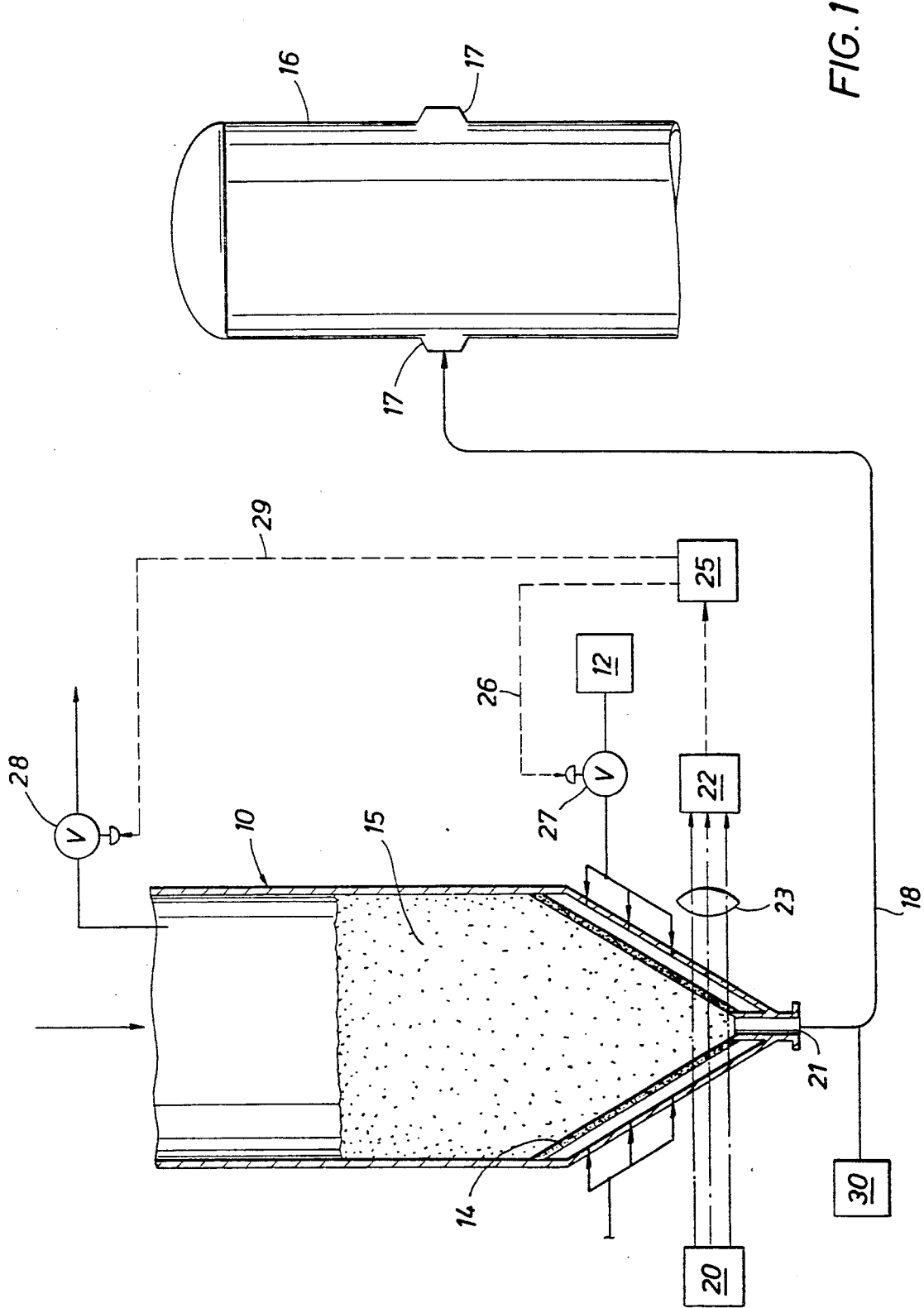
FIG. 1 illustrates a preferred embodiment of the present invention.

Generation of synthesis gas occurs by partially combusting organic or carbonaceous fuel, such as coal, at relatively high temperatures in the range of 800° to 2000° C. and at a pressure range of from about 1 to 200 bar in the presence of oxygen or oxygen-containing gases in a gasifier. Oxygen-containing gases include air, oxygen-enriched air, and oxygen optionally diluted with steam, carbon dioxide and/or nitrogen.

In the present invention, the fuel and gas mixture is discharged from a feed vessel apparatus, preferably having multiple outlets, each outlet being in communication with at least one burner associated with the gasifier. Typically, a gasifier will have burners in diametrically opposing positions. Generally, the burners have their discharge ends positioned to introduce the resulting flame and the agent of combustion into the gasifier.

Of particular importance in the manufacture of synthesis gas is the uniform manner in which the particulate fuel is introduced to the burners within the gasifier so as to minimize fluctuations in the mass flow rate of the fuel being supplied to the burners. If the mass flow rate of the particulate fuel fluctuates, zones of underheating are generated next to zones of overheating in the gasifier. As a result, in the zones of underheating the fuel is not completely gasified and in zones of overheating the fuel is completely converted into less valuable products, viz. carbon dioxide and water vapor. Additionally, locally high temperatures in the gasifier could damage the refractory lining which is normally arranged at the inner surface of the gasifier wall.

Various factors substantially affect the mass flow rate of the fuel being supplied to the burners. In particular, the discharging of the fuel from a feed vessel and the pneumatic transporting by conduit of the fuel from the feed vessel to the gasifier affect the mass flow rate of fuel. Specifically, fuel and gas mixtures having suspension densities ranging from about 50-800 kg/m$^3$ transported through a conduit having a diameter less than about 40 mm experience significant pressure drop due to the summation of various contributions such as frictional losses, restrictions, curvatures, etc., within the conduit.

The present invention preferably utilizes local suspension density measurements of the mixture discharged from the feed vessel and/or transport conduit to the gasifier that are derived from density-indicating devices to independently control the suspension density and the mass flow rate of the mixture conveyed to the reactor.

An advantage of the present invention is the controlling of the suspension density of the coal and gas mixture to provide a uniform, steady mass flow rate of the mixture to the reactor.

Another advantage of the present invention is the rapid detection of changes in coal mass flow rate so that the oxygen or oxidizing agent may be adjusted in ratio to the coal mass flow rate to the gasifier which provides more efficient and safer operation of the gasification process.

Although the invention is described hereinafter primarily with reference to particulate coal, the method and apparatus according to the invention are also suitable for catalysts and other finely divided reactive solid fuels which could be partially combusted, such as lignite, anthracite, bituminous brown coal, soot, petroleum coke, and the like. Preferably, the size of solid carbonaceous fuel is such that 90 percent by weight of the fuel has a particle size smaller than No. 6 mesh (A.S.T.M.).

Having thus generally described the apparatus and method of the present invention, as well as its numerous advantages over the art, the following is a more detailed description thereof, given in accordance with specific reference to the drawings. However, the drawings are of the process flow type in which auxiliary equipment, such as pumps, compressors, cleaning devices, etc. are not shown. All values are merely exemplary or calculated.

Referring to FIG. 1 of the drawing, an apparatus for controlling the suspension density of a particulate solids and gas mixture pneumatically conveyed via conduit 18 from a vessel, such as feed hopper 10, to means for injecting the mixture into a reactor 16, such as a burner 17, includes a hopper 10 preferably including injection of gas into the lower portion thereof.

Gas, such as nitrogen, carbon dioxide, or synthesis gas, is injected from source 12 into the lower portion of the hopper through porous material 14, which serves to distribute the gas throughout the bed 15 formed in the lower portion of the hopper 10.

Additionally, the injection of gas from source 12 can be compartmentalized as disclosed in Assignee's previously mentioned patent application which resulted in U.S. Pat. No. 4,941,779. Injecting gas into the lower portion of the hopper 10 provides for a uniform discharge flow rate of the mixture exiting the hopper 10 and allows for a smaller diameter conduit 18, say 40 mm, so as to maintain the high velocities, say 10 m/s, within the conduit 18 which are required to achieve a uniform mass flow rate of the mixture to the burners 17 of the gasifier 16 for the suspension densities used in the present invention as disclosed in Assignee's patent applications Ser. Nos. 098,152 (now U.S. Pat. No. 4,869,622); 098,588 (now U.S. Pat. No. 4,830,545); 098,589 and 098,590 (now U.S. Pat. No. 4,844,663) filed on Sep. 18, 1987.

At least one radiation source 20, preferably gamma ray, is positioned downstream of the point for injecting gas from source 12 into the lower portion of the hopper 10 and upstream of the burners 17 to direct radiation to penetrate the cross-sectional area of the mixture. A collimator 23 may be used to reduce the scatter of radiation received by the detector 22 to increase the sensitivity of the densitometer at low suspension densities.

Preferably, the radiation source 20 is located in proximity to the discharge port 21 but downstream of the point for injecting the gas from source 12 since injecting the gas into the lower portion of the hopper 10 causes the suspension density of the mixture to fluctuate.

In addition to the radiation source 20 located in proximity to the discharge port 21 of the hopper 10, another source (not shown) can be located downstream of the discharge port 21 but upstream of the burner 17. However, if the source and detector are located in close proximity to the point of injecting transport gas from source 30, then correction of the suspension density would be required for the reason stated above.

At least one radiation detector/transmitter 22 is positioned substantially diametrically opposite the source 20 to receive radiation transmitted from the source 20 after it has penetrated at least a portion of the mixture. The detector/transmitter 22 includes means for converting the received radiation to yield a determination of the suspension density of the mixture such as a device manufactured by Texas Nuclear Co. However, it is recognized that this detection/transmittal could be performed in any other manner well known to the art.

Signals relative to the determined suspension density of the mixture are transmitted from the detector/transmitter 22 to a processor-controller 25.

The processor-controller 25 compares the determined suspension density with a preselected value. If the determined suspension density is higher than the preselected value, then the suspension density of the mixture can be decreased to provide a uniform, constant mass flow rate to the gasifier by increasing the rate of injecting gas from source 12 by actuating flow control valve 27. In a like manner, if the determined suspension density is lower than a preselected value, then the suspension density of the mixture can be increased to provide a uniform, constant mass flow rate to the gasifier by decreasing the rate of injecting gas from source 12. FIG. 1 illustrates that the processor-controller 25 transmits signals, shown for ease of illustration as dashed line 26, to actuate valve 27 for increasing or decreasing the flow rate of the gas injected from source 12.

Alternatively or additionally, gas can be vented from the hopper 10 by actuating flow control valve 28 via transmission of a signal 29 from the processor-controller 25.

Although the system for controlling the suspension density is shown in FIG. 1 in its distributed form as discrete components, it would be readily understood by those skilled in the art that these components could be combined into a single unit or otherwise implemented as may be most convenient for the particular application at hand. Furthermore, although the preferred embodiment has been shown as using an electronic process control system for controlling the suspension density to provide a uniform, constant mass flow rate of the coal transported to the gasifier, it is also understood by those skilled in the art that the present invention could be effected using manual or pneumatic controls.

The foregoing description of the invention is merely intended to be explanatory thereof, and various changes in the details of the described method and apparatus may be made within the scope of the appended claims without departing from the spirit of the invention.

What is claimed is:

1. A method for controlling the suspension density of a particulate solids and gas mixture conveyed from a vessel having gas injected into a lower portion thereof to at least one means for injecting said mixture into a reactor, said method comprising:

positioning at least one radiation source downstream of a means for injecting gas into the lower portion of said vessel and upstream of said means for injecting said mixture into said reactor to direct radiation so as to penetrate the cross-sectional area of said mixture being conveyed;

positioning at least one radiation detector substantially diametrically opposite said radiation source to receive radiation from said source which is transmitted directly through that portion of said mixture which lies between said source and said detector;

transmitting radiation from said source to said detector;

reducing scatter of radiation received by said detector;

receiving radiation by said detector, said detector including means for converting the transmitted radiation to yield a determination of the suspension density of said mixture;

transmitting signals relative to the determined suspension density of said mixture to a means for comparing the determined suspension density with a preselected value;

comparing the determined suspension density with said preselected value; and adjusting the determined suspension density of said mixture to substantially obtain said preselected value, said adjusting including adjusting the flow rate of the gas injected into the lower portion of said vessel and venting gas from said vessel to the atmosphere.

2. An apparatus for controlling the suspension density of a particulate solids and gas mixture conveyed from a vessel having gas injected into a lower portion thereof to at least one means for injecting said mixture into a reactor, said apparatus comprising:

means for positioning at least one radiation source downstream of a means for injecting gas into the lower portion of said vessel and upstream of said means for injecting said mixture into said reactor to direct radiation so as to penetrate the cross-sectional area of said mixture being conveyed;

means for positioning at least one radiation detector substantially diametrically opposite said radiation source to receive radiation from said source which is transmitted directly through that portion of said mixture which lies between said source and said detector;

means for transmitting radiation from said source to said detector;

collimating means for reducing scatter of radiation received by said detector;

means for receiving radiation by said detector, said detector including means for converting the transmitted radiation to yield a determination of the suspension density of said mixture;

means for transmitting signals relative to the determined suspension density of said mixture to a means for comparing the determined suspension density with a preselected value;

means for comparing the determined suspension density with said preselected value; and means for adjusting the suspension density of said mixture to substantially obtain said preselected value, said means for adjusting including means for adjusting the flow rate of the gas injected into the lower portion of said vessel and means for venting gas from said vessel to the atmosphere.

* * * * *